D. S. CROSBY.
CHEESE BOX.
APPLICATION FILED MAR. 25, 1918.
1,308,893.
Patented July 8, 1919.
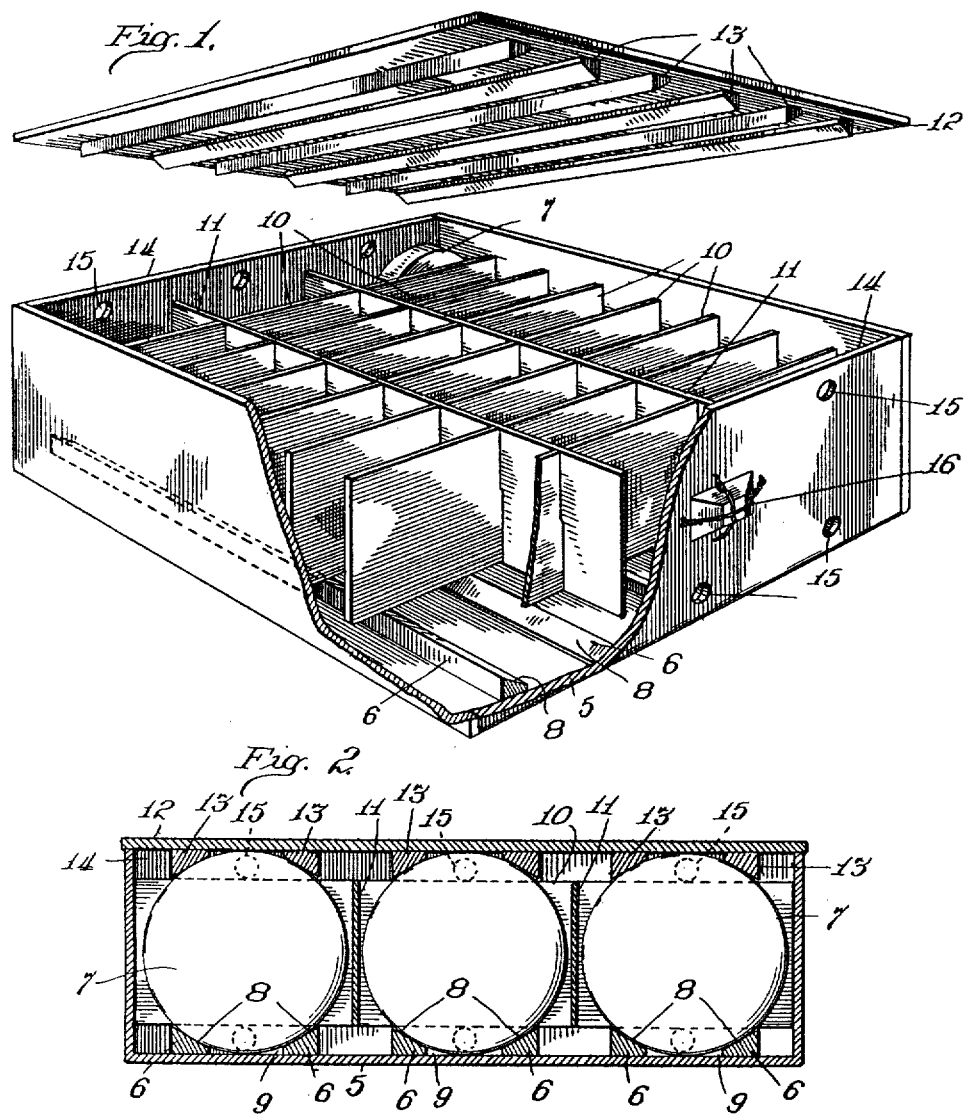

UNITED STATES PATENT OFFICE.

DELL S. CROSBY, OF CHICAGO, ILLINOIS.

CHEESE-BOX.

1,308,893. Specification of Letters Patent. Patented July 8, 1919.

Application filed March 25, 1918. Serial No. 224,465.

*To all whom it may concern:*

Be it known that I, DELL S. CROSBY, a citizen of the United States, and a resident of Chicago, in the county of Cook and State of Illinois, have invented a certain new and useful Improvement in Cheese - Boxes, of which the following is a description, reference being had to the accompanying drawing, which forms a part of my specification.

My invention relates to a cheese box or container adapted to hold, for shipping or storage, a plurality or number of "prints" or cakes of cheese, similar in cross-sectional configuration.

The invention contemplates a box or container made of suitable material, such as wood or fiber, and provided with partitions whereby the box or container is divided into a plurality of compartments, each of which is intended to contain or hold a "print" or cake of cheese so that the "prints" may be kept in separated relation; the invention also contemplating a box or container provided with suitable cleats or supporting members secured to the upper surface of the bottom of the box or container and disposed in a predetermined direction relative to the compartments and therefore to the cakes or "prints" of cheese; the construction and arrangement of the cleats being such that the cheese "prints" or cakes,—which are in a more or less "green" state when packed,—will be provided with such support as will not affect or destroy the configuration thereof, and at the same time will enable complete circulation of air about each "print" or cake, and thereby prevent the cheese molding as a result of the undue accumulation of moisture.

A further object of the invention is to provide a box or container provided with a cover-member having a series of cleats or members disposed in coöperative relation with the cleats or members secured to the bottom of the box, in order that the "prints" or cakes of cheese may be given proper support and maintained in proper position, in the event that the box or container becomes inverted.

A further object of the invention is to provide a box or container provided with the aforementioned partitions, which not only rest upon the cleats or members secured to the bottom of the box, but which do not extend entirely to the top of the box, so as to permit the "prints" or cakes of cheese to extend somewhat beyond the top of the partitions, thus not only enabling the ready handling of the respective "prints" or cakes, but also permitting complete circulation of air about the respective "prints" or cakes above and beneath the partitions.

A further object of my invention is to provide a box so formed as to induce a thorough circulation of air therethrough and therefore a thorough circulation of air about the respective "prints"; the preferred construction of the box consisting in having the two side walls, disposed at right angles to the cleats, provided with air admitting holes or ports, preferably arranged adjacent the top and bottom of the box, at points intermediate of the cleats adapted to support the same "prints" or cheese cake; and the side walls of the box, provided with the air-admitting ports or passages, being so formed or provided with means adapted to prevent the box or container being placed on end, that is, set up on the sides provided with the air-admitting ports or passages, as well as preventing different boxes or articles being placed upon the side walls having the air-admitting ports and thus preventing the proper circulation of air through said ports or openings.

The objects and advantages heretofore enumerated, as well as other advantages inherent in the construction, may be more thoroughly comprehended from the detailed description of the accompanying drawing, wherein:—

Figure 1 is a perspective view of my improved box, with the cover or lid shown in raised position, and one corner of the box as well as a portion of the interior partitions shown broken away.

Fig. 2 is a cross-sectional view with the cover or lid shown in place and cheese "prints" or cakes shown in the respective compartments.

In the particular exemplification of the invention, as disclosed in the drawing, the box or container is preferably of the rectangular construction shown and composed of suitable material such as wood or fiber, with the side walls and bottom secured together in any suitable manner.

My improved box or container is especially intended for packing and holding cheese molded into "prints" or cakes of disk or circular form in cross-section; the "prints" or cakes being substantially of uniform thickness and width; and for that reason, the width and length of the box or container, as well as the depth thereof, is of predetermined dimensions commensurate with the dimensions of the "prints" or cakes it is intended to contain or hold, in order that each box or container may hold a predetermined number of such "prints" or cakes of cheese and at the same time provide sufficient space intermediate of the respective "prints" or cakes and the side walls and partitions in order to permit circulation of air about each "print" or cake.

The bottom 5 of the box is provided with a plurality of cleats or members of suitable material secured in place against displacement in any suitable manner; the cleats being arranged in pairs and having their upper surfaces beveled and declining toward each other, as clearly shown in Fig. 2, so as to provide suitable contacting points for the "print" or cake of cheese which is illustrated at 7 in Fig. 2; the upper beveled surface of each cleat being of comparative width so as to give a sufficient bearing or contacting surface which will not injure or disfigure the circular configuration of the "print" or cake. The cleats 6 are of such size or height, and the bevel indicated at 8 is at such inclination or angle that the "print" or cake 7, in addition to contacting with and resting on the beveled surfaces of the correlated cleats, will also contact at an intermediate point with the bottom 5 of the box or container, as shown in Fig. 2, thus giving each "print" or cake of cheese three contacting or bearing points at the bottom which will provide adequate support for the cheese, even though the cheese is in a more or less green state, and thus prevent any objectionable disfiguration of the "prints." The cleats 6 are of such width and so beveled and arranged, relative to the diameter of the cheese "prints," that the "prints" or cakes may contact at a point intermediate of the cleats of a given pair, with the bottom 5 of the box, and yet at the same time provide sufficient space, as shown at 9, intermediate of the sides of the cleats 6 and the perimeter or marginal edge of the "prints" or cakes, whereby circulation of air beneath the bottom of the "prints" or cakes may be had.

The box or container is provided with a suitable number of preferably interlocking partition members 10 and 11, which divide the box into a predetermined number of compartments, each of which is adapted to hold a single "print" or cake. The partition members are spaced apart a distance slightly greater than the dimensions of the "prints" or cakes 7, so that ample space will be provided intermediate of the "prints" or cakes and the partition members for the circulation of air throughout the compartments, and therefore about the "prints" or cakes. The partition members 10 and 11 may be of any suitable material; with the partition members 10 disposed transversely of the bottom 5 of the box and therefore transversely of the cleats or members 6; while the partition members 11 are disposed parallel with the cleats 6, and so interlocked or secured to the partition members 10 that the longitudinal dimensions of each compartment will be disposed transversely of the cleats or members 6, thus compelling the "prints" or cakes of cheese 7 to be inserted in the respective compartments in the manner illustrated in Fig. 2, namely transversely of the cleats or spacing members 6.

The partition members 10 and 11 are secured on top of the cleats 6, as shown in Fig. 2, and thus provide a passage beneath the partitions for the circulation of air; and the partitions are also preferably made of a lesser height or dimensions than the depth of the box and therefore also of a lesser height than the radial dimensions of the "prints" or cakes, so that the latter are permitted to extend above the partitions; the height and arrangement of the partitions being such as to also provide a sufficient space above the partitions to accommodate the cover-member or lid 12.

The cover or lid 12 is preferably provided with a plurality of cleats or members 13, substantially similar in construction and arrangement to the cleats 6 secured on the bottom of the box. The cleats 13 on the cover or lid 12 are intended to depend into the box when the lid is in place, as shown in Fig. 2, and are not only arranged in pairs parallel with the cleats 6 on the bottom, but also preferably in vertical alinement therewith as shown, so as to contact with the tops of the marginal edges or rims of the "prints" or cakes. The cleats 13 of each pair, like cleats 6, are beveled toward each other so as to provide proper support for the upper edges of the "prints" or cakes in the event that the box or container becomes inverted; the cleats 13, like cleats 6, being of such dimensions and bevel, that an intermediate point on the perimeter of the "prints" or cakes may contact with the cover or lid 12 in a manner similar to that previously described in connection with the arrangement at the bottom of the box or container.

It has been found in practice that the packing and storage of cheese in boxes or containers, as heretofore constructed, namely with the cheese "prints" in close contact with the bottom and sides of the box and with each other, results in the accumulation of moisture where the cheese contacts with the walls of the containers, and with each other, which causes the cheese to mold and therefore, to a more or less degree, become spoiled. My improved box or container is adapted to overcome this serious objection, by preventing any contact between the different "prints" or cakes of cheese and yet at the same time providing suitable supporting means for the "prints" that air may pass entirely about the different "prints" or cakes and effect a drying thereof.

In order to cause a complete circulation of air through the box or container, I have shown the two end walls 14, namely the walls disposed at right angles to the cleats, provided with a suitable number of ports or openings 15 preferably arranged adjacent to the top and the bottom of the box or container and at points intermediate of the cleats of the respective pairs of cleats, as shown in Fig. 2; the ports 15 enabling the air to pass lengthwise of the box or container, intermediate of the cleats and also beneath and above the partitions.

In order to prevent the box or container being set on ends, and also prevent close contacting end to end relation, the ends provided with the ports or openings are also preferably provided at an intermediate point, with a suitable projection or block, as shown at 16. As is evident from this construction, the protrusion or block will prevent the box being set up on end and also will prevent a closing off of the air holes or ports, because it will be impossible to arrange or pack the boxes or containers in such close endwise relation as to completely shut off the air ports.

I have shown and described a box especially adapted for the storage of "prints" or cakes of cheese, formed circular in cross-section and with interlocking partitions, but certain modifications may be made without, however, departing from the spirit of my invention, as disclosed in the appended claim.

What I claim is:—

A cheese box having a bottom and four side walls, the upper surface of the bottom being provided with parallelly disposed cleats arranged in pairs and extending from end to end of the box, the tops of the cleats being provided with smooth beveled surfaces, with the top surfaces of the cleats of a pair being disposed toward each other and providing cheese-contacting surfaces of comparative width, the height of the cleats, the degree of bevel of the upper surfaces and the distance between the cleats of each pair being correlated so as to permit the marginal edge of the cheese "print" or cake to contact with the upper surfaces of the cleats and the bottom at a point intermediate of the cleats and permit circulation of air intermediate of the cleats and said point of contact of the cheese "print" with the bottom, a plurality of interlocking partition members, of less depth than the depth of the box arranged on said cleats in spaced relation with the bottom of the box, whereby the box is provided with a plurality of compartments permitting circulation of air throughout the tops and bottoms of said compartments, air-admitting openings in opposite side walls of the box adjacent the top and bottom thereof, and a cover member for said box.

DELL S. CROSBY.

Witnesses:
GEORGE HEIDMAN,
F. A. FLORELL.

Copies of this patent may be obtained for five cents each, by addressing the "Commissioner of Patents, Washington, D. C."